United States Patent [19]

Skinner

[11] 4,270,886

[45] Jun. 2, 1981

[54] FIFE COUPLINGS

[75] Inventor: Robert T. J. Skinner, High Wycombe, England

[73] Assignee: Lucas Industries Limited, Birmingham, England

[21] Appl. No.: 43,827

[22] Filed: May 30, 1979

[30] Foreign Application Priority Data

Jul. 18, 1978 [GB] United Kingdom ............... 30195/78

[51] Int. Cl.[3] ....................... F04B 19/22; F04B 29/00; F16L 15/00

[52] U.S. Cl. ..................................... 417/462; 285/219

[58] Field of Search ................ 417/462; 285/219–221, 285/390, 355

[56] References Cited

U.S. PATENT DOCUMENTS

| | | | |
|---|---|---|---|
| 2,342,425 | 2/1944 | Parker | 285/221 |
| 2,770,260 | 11/1956 | Henderson | 285/390 |
| 2,954,246 | 9/1960 | Totah et al. | 285/355 |
| 4,055,387 | 10/1977 | Potter | 417/462 |
| 4,067,304 | 1/1978 | Potter | 417/462 |

*Primary Examiner*—William L. Freeh

[57] ABSTRACT

A pumping apparatus has a body part including an inner sleeve and an outer sleeve. A passage is formed in the sleeve with the portion of the passage in the outer sleeve being threaded to receive a pipe fitting. Grooves are machined in the outer sleeve about the passage to reduce the stressing of the outer sleeve when the fitting is tightened.

2 Claims, 2 Drawing Figures

FIFE COUPLINGS

This invention relates to fuel pumping apparatus of the kind comprising a body part, a pump component movable within a bore in the body part, a passage formed in and extending to the periphery of the body part, the end portion of said passage being provided with a screw thread which in use, receives a threaded pipe fitting.

Such apparatus is well known in the art. In one form of apparatus the pump component comprises a rotary cylindrical distributor member which distributes fuel in turn through a delivery passage formed therein to the outlet passages, the outlet passages extending to the periphery of the body part and being threaded at their outer ends to receive pipe unions. The distributor member because of the need to minimise fuel leakage has a very small working clearance with the bore. It has been found that if a or the, pipe union or unions are tightened to an excessive degree, the resulting stresses in the body can cause slight distortion of the bore which may increase the risk of seizure of the distributor member within the bore or may increase the working clearance and thereby increase the possibility of leakage.

The object of the invention is to provide an apparatus of the kind specified in a simple and convenient form.

According to the invention, in an apparatus of the kind specified the body part of the apparatus is cut away about the passage to define a boss which acts to minimise the stressing of the body when the pipe fitting is tightened.

One example of a fuel pumping apparatus in accordance with the invention will now be described with reference to the accompanying drawings in which.

Figure 1:
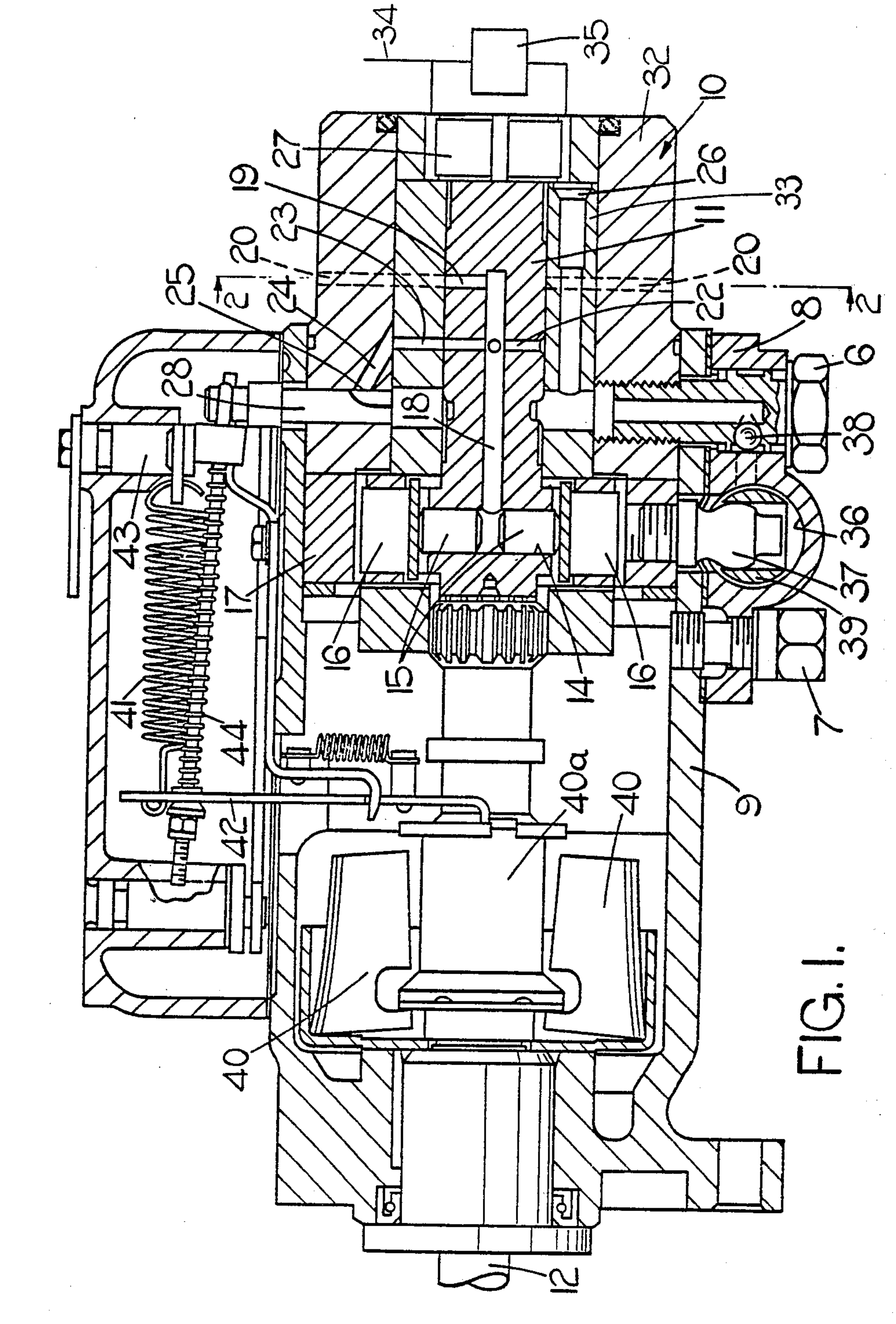
FIG. 1 is a sectional side elevation of the apparatus.

Referring to the drawings the apparatus comprises a multipart body which includes a first part 9 of cup shaped form in which is secured the second part 10 of the body, the body 10 is held in position within the body part 9 by means of screw threaded bolts one of which is seen at 6. This bolt also serves to secure a housing part 8 to the body 9 and a further bolt 7 is also provided for this purpose.

The body 10 comprises an outer sleeve 32 and an inner sleeve 33. The outer sleeve during the manufacture of the apparatus is shrunk onto the inner sleeve 33 and the outer sleeve is thereby in tension and maintains the inner sleeve under compression. Formed within the sleeve 33 is a bore in which is mounted a rotary cylindrical distributor member 11. This is coupled to an input shaft 12 which is located in the part 9 and in use, the shaft 12 is adapted to be driven in timed relationship with an engine with which the apparatus is associated. Formed within the distributor member is a transverse bore 14 in which is mounted a pair of reciprocal plungers 15 which are arranged to be moved inwardly as the distributor member rotates, through the intermediary of a pair of rollers 16 respectively, by cam lobes not shown, formed on an annular cam ring 17 mounted for angular movement within the part 9.

Also formed in the distributor member 11 is a longitudinally extending passage 18 which at one end is in communication with the transverse bore and at its other end is in communication with a radially disposed delivery passage 19. This passage is arranged to register in turn with a plurality of equi-angularly spaced delivery ports constituted as shown in FIG. 1, by passages 20. These passages extend through the sleeves 33 and 32 and at their outer ends as is more clearly shown in FIG. 2, the passages are of enlarged diameter and are provided with internal screw threads. The registration of the passage 19 with one of the delivery ports takes place during the whole time the plungers 15 are capable of being moved inwardly so that liquid fuel contained within the transverse bore 14 will be displaced to a combustion space of the associated engine.

At another point the longitudinal passage 18 is in communication with a plurality of equi-angularly spaced and radially disposed inlet passages 22 which are arranged to register in turn with an inlet port 23 formed in the sleeve 33. The port 23 communicates with a passage 24 formed in the sleeve 32 and with the outlet 26 of a feed pump by way of a circumferential groove formed on the periphery of the distributor member. The passage 24 opens into a bore which accommodates an angularly adjustable throttle member 28 and the size of the port 25 which is formed at the end of the passage 24, is controlled by a suitable groove on the throttle member. In this manner the amount of fuel which is supplied to the bore 14 when the plungers can move outwardly, is controlled.

The feed pump which is referenced 27 has an inlet 34 for connection to a source of fuel and the inlet and outlet of the pump are interconnected by a control valve 35 which controlls the output pressure of the feed pump in a manner so that it varies in accordance with the speed at which the apparatus is driven.

The cam ring 16 is angularly adjustable by means of a piston 39 which is connected to the cam ring by way of a radially disposed peg 37. The piston 39 is slidable within a cylinder 36 formed in the housing 8 and the cylinder 36 communicates with the outlet of the feed pump by way of a passage formed in the bolt 6. An anti shock valve 38 is provided in this passage, this being the conventional practice.

The angular setting of the throttle member 28 is determined by a governor mechanism which includes weights 40 which under the action of centrifugal force, urge a sleeve 40A against the action of a governor spring 41 to which it is connected by means of a link 42. The link 42 is pivoted intermediate its ends and is also connected by means of a rod 44 to the throttle member 28. The force exerted by the governor spring can be controlled by an operator adjustable member 43. The arrangement is such that for a given setting of the operator adjustable member, the weights will move outwardly in opposition to the force exerted by the spring 41 and a gradual reduction in the flow of fuel to the associated engine will take place so that an equilibrium speed is achieved.

Figure 2:
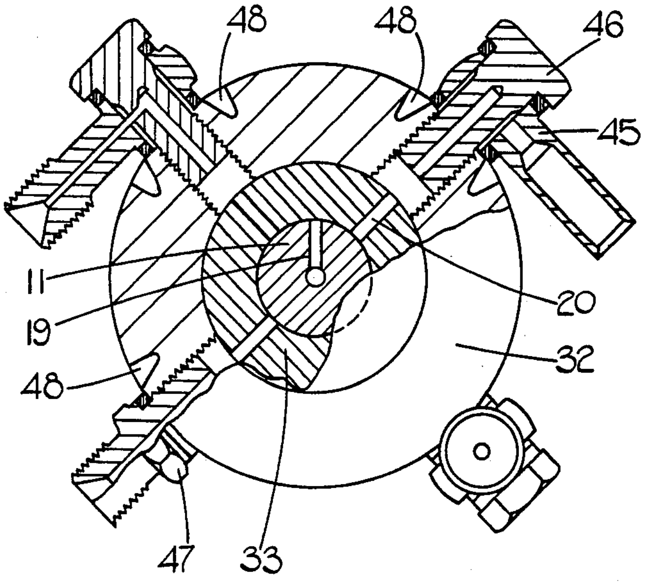
FIG. 2 is a section generally along the line 2—2 of FIG. 1.

Turning now to FIG. 2 various examples are shown of pipe unions which can be connected to the outlet passages 20. As has already been stated the outer portions of the passages 20 are of enlarged diameter and conveniently these portions comprise the whole of the passages 20 which lie within the sleeve 32.

In the upper right hand portion of FIG. 2 a banjo connection 45 is shown which is secured to the peripheral surface of the sleeve 32 by means of a banjo bolt, 46. Similar arrangements are shown in the upper left hand portion of the drawing and in the bottom right hand portion of the drawing. In the bottom left hand portion of the drawing a simple pipe connector 47 is shown and which is screw threaded into the threaded portion of the respective outlet 20.

When the banjo bolts 46 or the union 47 are tightened, the outer skin of the sleeve 32 tends to be placed in compression by the forces generated by the interengaging screw threads. Since the outlets are in a common plane, the compression forces acting on the sleeve 33 due to the fact that the sleeve 32 is in tension, are at least partly relieved and this therefore allows the bore in the sleeve 33 to enlarge in diameter. This can result in leakage and possibly also a reduction in the working clearance between the distributor member and the surface of the bore at other axial positions along the rotary axis of the distributor member.

In order to minimise the possibility of such distortion annular grooves are machined in the sleeve 32 about the threaded portion of the passages 20. The annular grooves are indicated in FIG. 2 at 48 and it will be noted that they extend to between a third and a half of the thickness of the sleeve 32. The provision of the aforesaid grooves creates a barrier to the compressive stress which is generated by the screw threads and thereby minimises the reduction in the compression applied by the sleeve 32 to the sleeve 33.

The grooves 48 create in effect sunken bosses and provide stress relief without increasing the diameter of the sleeve 32 at any point. The thickness of metal forming the aforesaid bosses must be carefully controlled so that thread distortion when the banjo bolts or pipe unions are tightened is not excessive.

I claim:

1. In a fuel pumping apparatus comprising a body part, a pump component having a pumping chamber and pumping means movable within a bore in the body part, the body part comprising inner and outer sleeves, the outer sleeve being located about the inner sleeve and shrunk thereon to impose a compressive stress thereon, a passage formed in and extending through said sleeves to the periphery of the body part with the portion of the passage in the outer sleeve being provided with the screw thread, means for the delivery of fuel from said chamber to said passage, and the outer end portion of said passage which is provided with a screw thread receiving in use, a complementary threaded pipe fitting, wherein the body part of the apparatus is cut away about said passage by between one-third and one-half of the thickness of the outer sleeve to define a boss which acts to minimize the stressing of the body part when the pipe fitting is tightened.

2. In a fuel pumping apparatus comprising a body part, a pump component having a pumping chamber and pumping means movable within a bore in the body part, a passage formed in and extending to the periphery of the body part, means for the delivery of fuel from said chamber to said passage, and the outer end portion of said passage being provided with a screw thread to receive in use, a complementary threaded pipe fitting, a barrier against compressive stresses generated at said screw thread, said barrier including an annular groove circumambient said passage outer end portion and located in a plane which is oriented transversely to said passage so that said passage outer end portion is separated from the remainder of the body part periphery and stands proud of said body part, such separation and proud standing outer end portion acting as a boss which minimizes the stressing of the body part when the pipe fitting is tightened.

* * * * *